(12) United States Patent
Nelson et al.

(10) Patent No.: US 6,233,236 B1
(45) Date of Patent: May 15, 2001

(54) METHOD AND APPARATUS FOR MEASURING TRAFFIC WITHIN A SWITCH

(75) Inventors: Jeffrey J. Nelson, Louisville; Michael E. O'Donnell, Westminster, both of CO (US)

(73) Assignee: McDATA Corporation, Broomfield, CO (US)

( * ) Notice: Subject to any disclaimer, the term of this patent is extended or adjusted under 35 U.S.C. 154(b) by 0 days.

(21) Appl. No.: 09/228,678

(22) Filed: Jan. 12, 1999

(51) Int. Cl.[7] .............................. H04L 12/50; H04Q 11/00
(52) U.S. Cl. .............................................. 370/359; 370/232
(58) Field of Search ..................................... 370/359, 229, 370/231, 232, 235, 248, 252, 253, 379, 382, 395, 396, 398, 400, 412, 413, 415, 417, 419, 422, 218

(56) References Cited

U.S. PATENT DOCUMENTS

| | | | |
|---|---|---|---|
| 5,400,087 | * | 3/1995 | Uramoto et al. ..................... 348/699 |
| 5,535,197 | * | 7/1996 | Cotton ................................... 370/414 |
| 5,563,526 | * | 10/1996 | Hastings et al. ........................ 326/37 |
| 5,581,228 | * | 12/1996 | Cadieux et al. ................... 340/140.2 |
| 5,732,041 | * | 3/1998 | Joffe ................................ 365/230.05 |
| 5,757,795 | * | 5/1998 | Schnell ................................. 370/392 |
| 5,802,054 | * | 9/1998 | Bellenger ............................. 370/401 |
| 5,841,773 | * | 11/1998 | Jones .................................... 370/395 |
| 5,909,686 | * | 6/1999 | Muller et al. ........................ 370/400 |
| 5,912,889 | * | 6/1999 | Preas et al. .......................... 370/359 |
| 5,926,625 | * | 7/1999 | Corlett et al. ........................ 370/232 |
| 5,938,749 | * | 8/1999 | Rusu et al. ............................. 710/54 |
| 5,949,786 | * | 9/1999 | Bellenger ............................. 370/401 |

* cited by examiner

Primary Examiner—Douglas Olms
Assistant Examiner—Phirin Sam
(74) Attorney, Agent, or Firm—Stuart T. Langley, Esq.; William J. Kubida, Esq.; Richard A. Bachand, Esq.

(57) ABSTRACT

A switch including a plurality of input/output (I/O) ports and a switching element programmably coupling a first of the I/O ports with a second of the I/O ports. An analysis device is associated with the first I/O port measuring at least one data traffic parameter specific to data traffic between the first I/O port and the second I/O port.

20 Claims, 6 Drawing Sheets

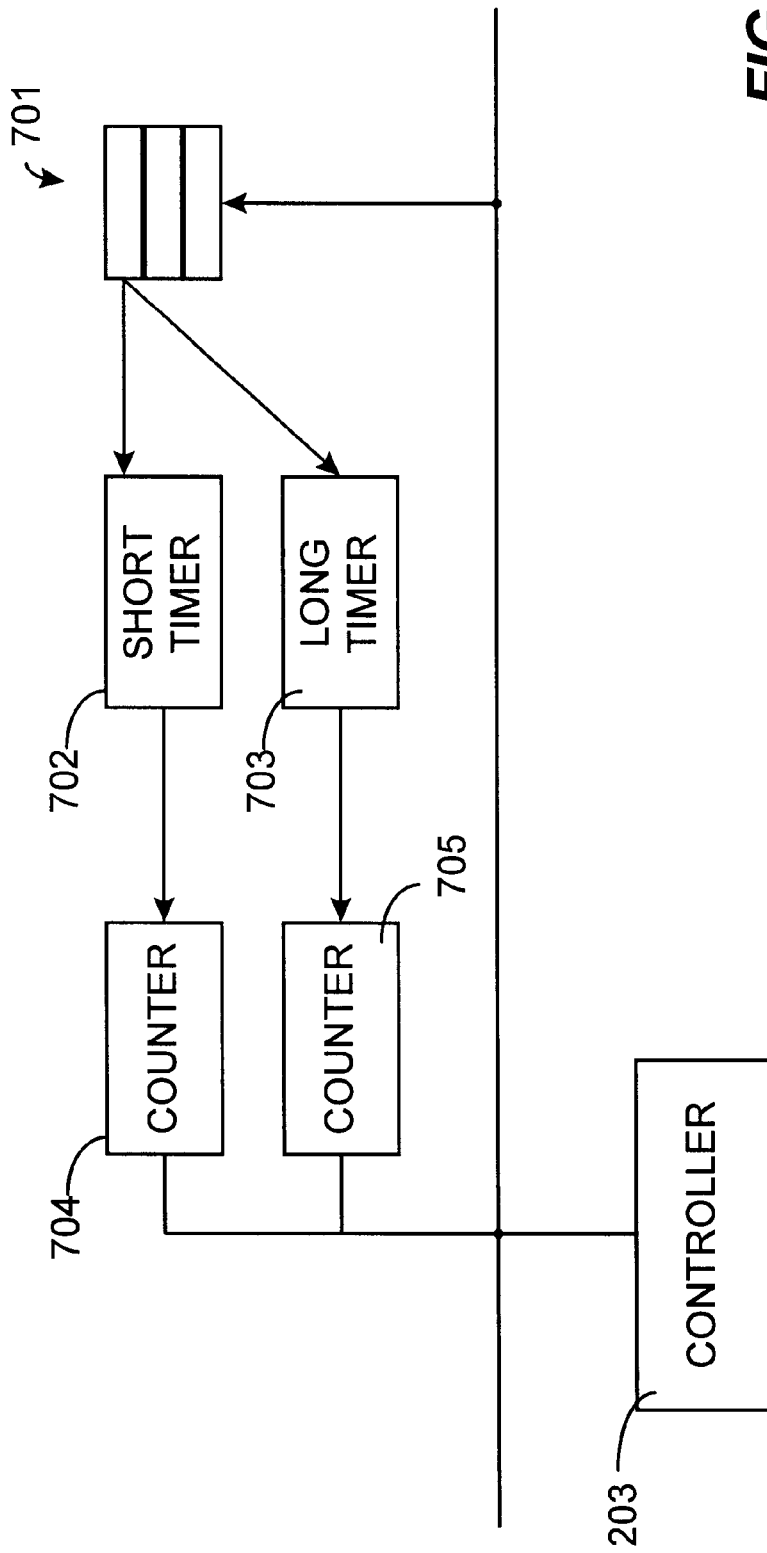

METHOD AND APPARATUS FOR MEASURING TRAFFIC WITHIN A SWITCH

BACKGROUND OF THE INVENTION

1. Field of the Invention

The present invention relates, in general, to methods and devices for switched data communication, and, more particularly, to methods and devices for measuring traffic analysis within a fibre channel switch.

2. Relevant Background

Fibre Channel is a high performance serial interconnect standard designed for bi-directional, point-to-point communications between servers, storage systems, workstations, switches, and hubs. It offers a variety of benefits over other link-level protocols, including efficiency and high performance, scalability, simplicity, ease of use and installation, and support for popular high level protocols.

Fibre channel employs a topology known as a "fabric" to establish connections (paths) between ports. A fabric is a network of one or more switches for interconnecting a plurality of devices without restriction as to the manner in which the switch can be arranged. A fabric can include a mixture of point-to-point and arbitrated loop topologies.

In fibre channel a path is established between two nodes where the path's primary task is to transport data from one point to another at high speed with low latency, performing only simple error detection in hardware. The fibre channel switch provides flexible circuit/packet switched topology by establishing multiple simultaneous point-to-point connections. Because these connections are managed by the switches or "fabric elements" rather than the connected end devices or "nodes", fabric traffic management is greatly simplified from the perspective of the device.

Fibre channel fabric devices include a node port or "N_Port" that manages the fabric connections. The N_port establishes a connection to a fabric element (e.g., a switch) having a fabric port or F_port. Devices attached to the fabric require only enough intelligence to manage the connection between the N_Port and the F_Port. Fabric elements include the intelligence to handle routing, error detection and recovery, and similar management functions.

A switch is a multi-port device where each port manages a simple point-to-point connection between itself and its attached system. Each port can be attached to a server, peripheral, I/O subsystem, bridge, hub, router, or even another switch. A switch receives a connection request from one port and automatically establishes a connection to another port. Multiple calls or data transfers happen concurrently through the multi-port fibre channel switch. A key advantage of switched technology is that it is "non-blocking" in that once a connection is established through the switch, the bandwidth provided by that connection is not shared. Hence, the physical connection resources such as copper wiring, fiber optic cabling and radio frequency bandwidth can be more efficiently managed by allowing multiple users to access the physical connection resources as needed.

Switched communication systems work most efficiently when the switch resources are allocated efficiently. In other words, in a multi-port switch, each of the ports desirably processes an equitable amount of data traffic. When one connection through the switch absorbs an unbalanced amount of traffic, traffic delays are caused even while the switch possesses unused resources (i.e., unused ports and connection resources). The end result of an unbalanced switch is unnecessary average latency in processing traffic caused by bottlenecked connections within the switch.

User's desire knowledge about the data traffic that flows through a switch in order to efficiently manage that data traffic and avoid bottlenecks. A switch is most efficiently used if the traffic load through that switch is reasonably balanced. When a particular switch port or ports are used heavily by a single host or destination those ports are not available to handle other traffic. Similarly, it is desirable to have knowledge about the type of data traffic flowing between a pair of ports. In a fibre channel system, for example, the data traffic may comprise any of a number of FC-4 specified frame types. Knowledge of the frame type can be used to configure and reconfigure the communication network for more efficient utilization of resources.

Prior approaches provide a means for counting received or transmitted frames on a single port basis. This allowed a user to monitor traffic at a single switch node, however, does not provide an mechanism to reliably correlate the traffic between a source port and a destination port within the switch. In other words, the prior approaches enable one to monitor the traffic from a node port to a switch port, but not from one switch port to another switch port. The prior approach enables one to determine if a particular path or port is experiencing an unusually high load, but does not provide sufficient information to determine what host(s) is/are driving the port. If multiple hosts are driving the port, prior approaches are unable to identify the proportionate share of the load of the port for which each of the driving hosts is responsible. Moreover, because prior approaches are not protocol specific, it is difficult or impossible to tell what type of traffic is consuming the bandwidth of a particular host port.

A need exists for a method and device for measuring. protocol traffic that provides information about traffic within a switch from a source port to a destination port. A need also exists for an analysis tool that measures traffic on a protocol specific basis.

SUMMARY OF THE INVENTION

These and other limitations of the prior art are solved by a switch including a plurality of input/output (I/O) ports and a switching element programmably coupling a first of the I/O ports with a second of the I/O ports. A profile device is associated with the first I/O port measuring at least one data traffic parameter specific to data traffic between the first I/O port and the second I/O port.

In another aspect, the present invention involves a method for operating a switch in a communication system having a plurality of I/O ports. A first connection request is generated in a first of the plurality of I/O ports. A template is supplied to the first I/O port and, in response to data frame information in the first I/O port, determining whether selected information in the frame matches the supplied template. When a match is determined, a counter is incremented.

BRIEF DESCRIPTION OF THE DRAWINGS

FIG. 7 shows a portion of a queue controller shown in FIG. 3 in greater detail.

DETAILED DESCRIPTION OF THE PREFERRED EMBODIMENTS

Figure 1:
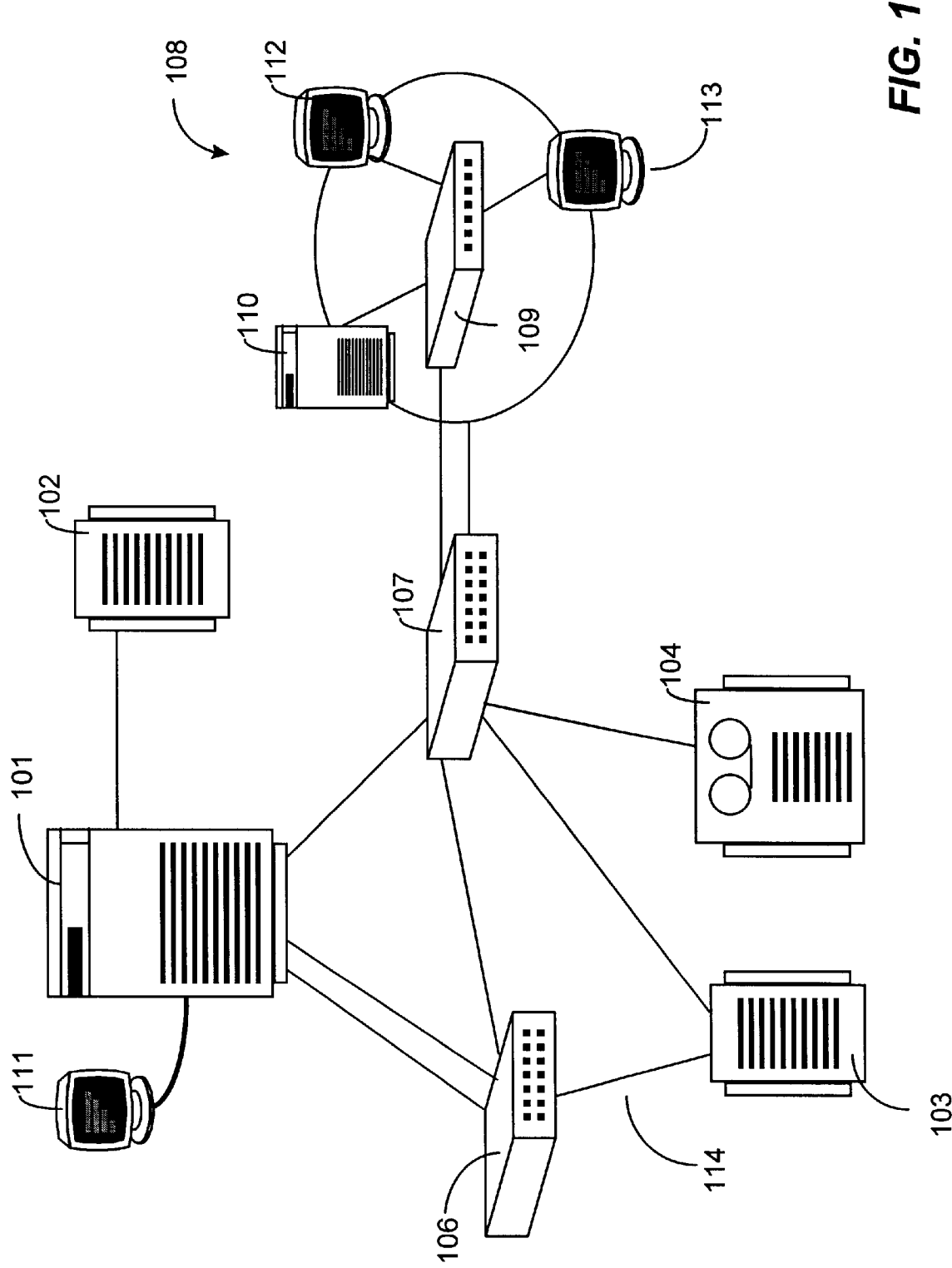
FIG. 1 shows a generalized fibre channel environment implementing the method and systems in accordance with the present invention.

The present invention generally involves a method and device structure useful to measure data traffic between two switch ports in a switch. Hardware mechanisms are provided within each switch port to monitor traffic based on criteria including the destination identifier and the FC-4 frame type (e.g., IP, SCSI, FC-SW, SBCCS, and the like). With this information, frame traffic can be monitored between a pair of ports and/or by the type of traffic. For example, hardware can be programmed by software management to count the number of frames having a source port 6 and directed to a destination port 14 that are SCSI type frames.

Particular uses of the information gathered in accordance with the present invention include:

measuring host-to-peripheral bandwidth utilization;

isolating "hot spots" within a switched topology (i.e., isolating any host connection that is servicing multiple ports on a switch such that one or more of the ports attached to a device are not being serviced due to a single device generating a high quantity of traffic);

load balancing; and isolating hot I/O ports (i.e., a switch port that is consumed handling repetitive I/O activity).

In a first embodiment the present invention measures traffic in a manner that tracks the number of frames that pass from one port to another. In an alternative embodiment, the present invention measures traffic in a manner that tracks the number of frames of one or more user-specified frame type(s) (e.g., the FC-4 frame type) that are sent by a particular source port to a destination port within the switch. In yet another alternative, both the number of frames and the number of frames of one or more of the user-specified frame type(s) are monitored. In general, the present invention enables frame traffic to be monitored on a port-by-port and frame-by-frame basis using any information included in the frame header as it is processed by a particular port.

For example, the present invention enables a first port to maintain a count of the number of frames it sends to a user-defined second port to identify if the port-to-port connection in the switch is carrying an unbalanced portion of traffic. The present invention can be implemented to separately track Small Computer System Interface (SCSI) frames and Internet Protocol (IP) frames. Alternatively, a switch may track only one type of frame (e.g., SCSI) frames, and not track other frame types of less interest. This frame-type specific information provides more useful information for administrators responsible for configuring the switch.

It is contemplated that the frame traffic analysis results generated in accordance with the present invention can be provided to the route control logic (not shown) and/or the address assignment algorithm that determine which port will be designated as the destination port for each frame. In many cases more than one port may be able to serve as a destination port for a particular frame, and traffic analysis information is useful in balancing the traffic load amongst these redundant resources.

FIG. 1 shows a generalized fibre channel environment implementing the method and systems in accordance with the present invention. FIG. 1 illustrates a number of devices and connections between the devices indicated by connecting lines. Each device includes one or more ports. In fibre channel, these ports are generally classified as node ports (N_Ports), fabric ports (F_Ports), and expansion ports (E_Ports), although other designations may be used in particular applications. Node ports are located in a node device such as server 101, disk arrays 102 and 103, and tape storage device 104. Fabric ports are located in fabric devices such as switch 106 and switch 107. Optionally, an arbitrated loop network 108, can be linked to the fabric using fabric arbitrated loop ports (FL_Ports).

The devices shown in FIG. 1 are coupled by "links" or "paths" indicated by lines. A path can be established between two N_Ports using one or more links. For example, a direct or point-to-point path is established using a single link such as the path between server 101 and disk array 102 shown in FIG. 1. In this case, each N_Port manages the point-to-point connection between the other device's N_Port. A packet-switched path using multiple links can also be provided using a switch 106 or 107. For example, the N_Port in server 101 can establish a path with the N_Port of disk array 103 through switch 106. In this case, each N_Port makes a connection to an F_port in switch 106. Switch 106 also includes an expansion port or E_Port that enables a path to another E_Port in switch 107. An inter-switch link (ISL) (i.e., a link that connects two switches) enables each N_Port to couple to each other N_Port in the fabric through one or more paths. Switch 107 also includes a fabric loop port (FL_Port) that supports a link to arbitrated loop 108. In loop 108, hub 109 includes N_Ports supporting links to loop server 110 and workstations 112 and 113 as well as an FL_Port supporting a link to switch 107. Devices 111, 112, and 113 represent user terminals, personal computers, or workstations coupled to the fabric through the arbitrated loop connection.

The present invention is implemented in one or more of the switches 106 and 107 shown in FIG. 1. For example, in a path established through switch 106, switch 106 measures traffic between one or more user-selected source port/destination port pairs. In an optional implementation, switch 106 selectively measures a selected frame type such that only, for example, SCSI or IP frames are monitored. For example, switch 107 may pass IP frames addressed to workstations 112 and 113, however pass SCSI frames to storage device 110. All of these frames will use the same port in switch 107 in the topology shown in FIG. 1. Using the principle embodiment of the present invention, any source port in switch 107 can maintain a count of the number of frames sent to the port coupled to loop 108. Using the frame-type specific analysis in accordance with the optional embodiment of the present invention, switch 107 is able to count the number of SCSI frames that use the port coupled to loop 108 separately from or to the exclusion of IP frames, for example. Until now this type of information has not been acquired by a switch.

Figure 2:
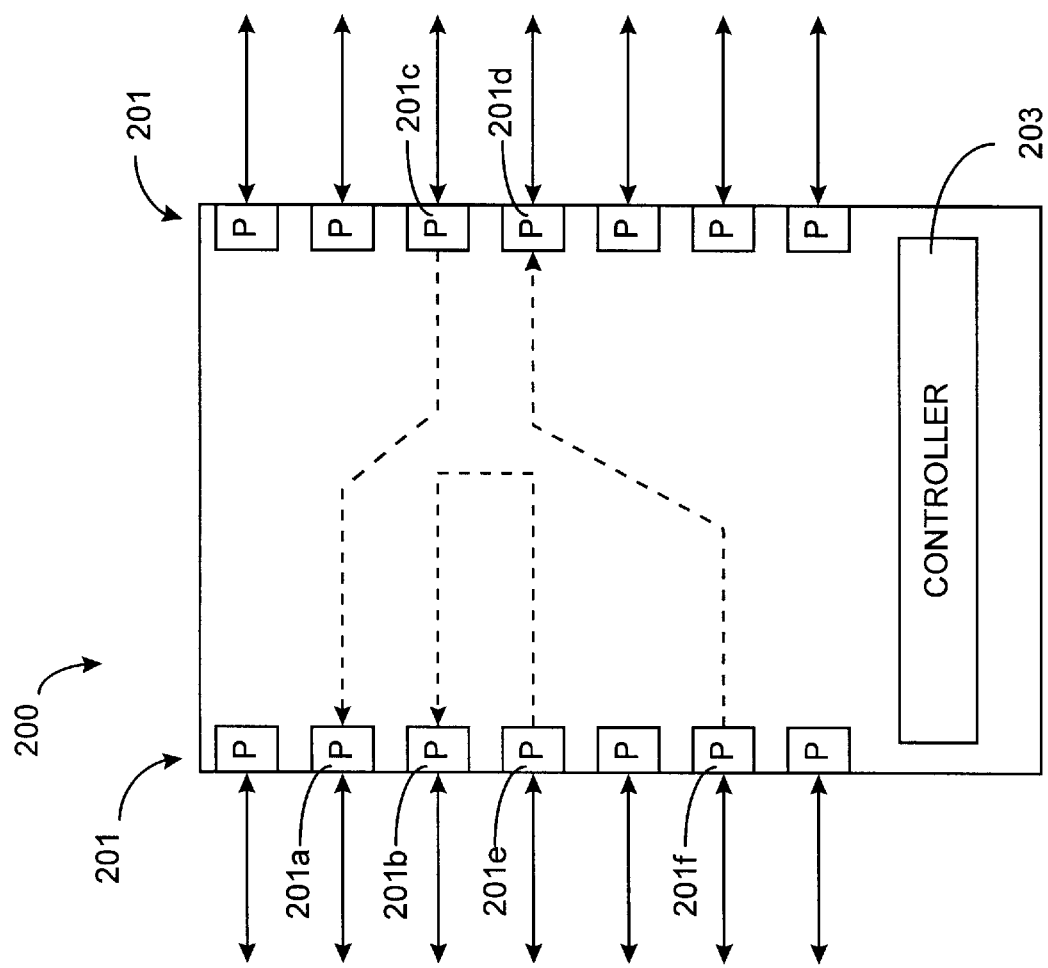
FIG. 2 shows in block diagram form a switch implementing the method and apparatus in accordance with the present invention.

FIG. 2 shows a particular switch 200 embodying the traffic analysis method and apparatus in accordance with the present invention. Each port 201 (labeled P in FIG. 2) is an input/output (I/O) port that supports bi-directional data communication with external devices. Each port contains transmit and receive circuitry (not shown) of any available design and technology. However, switch 200 could be equivalently configured with a plurality of dedicated input ports and a plurality of dedicated output ports for purposes of the present invention.

Switch 200 includes a configurable switching element, illustrated diagrammatically by dashed lines, that programmably couples any one of the ports to any other of the ports. The switching element comprises, for example, a full or partial crossbar or other available switching device for programmably coupling one port 201 to another port 201. The connections may be uni-directional or bi-directional to meet the needs of a particular application.

A port 201 that receives external data is referred to as a "source port" while a port that transmits data to an external destination is referred to as the "destination port". Hence, a connection is made within switch 200 from a source port to a destination port. Example connections in FIG. 2 are illustrated by dashed lines between ports with the arrowhead pointing at the destination port.

Controller 203 is operatively coupled to each port by a connection bus (not shown). Controller 203 receives connection requests from each of ports 201 and programs the configurable connections in the switching element. In operation, a source port receives a data packet from an external device. If a connection already exists to a destination port the data is forwarded along the existing connection. When a connection has not been established, logic within each port detects that the received data requires a connection set up and makes a connection request via controller 203.

Figure 3:
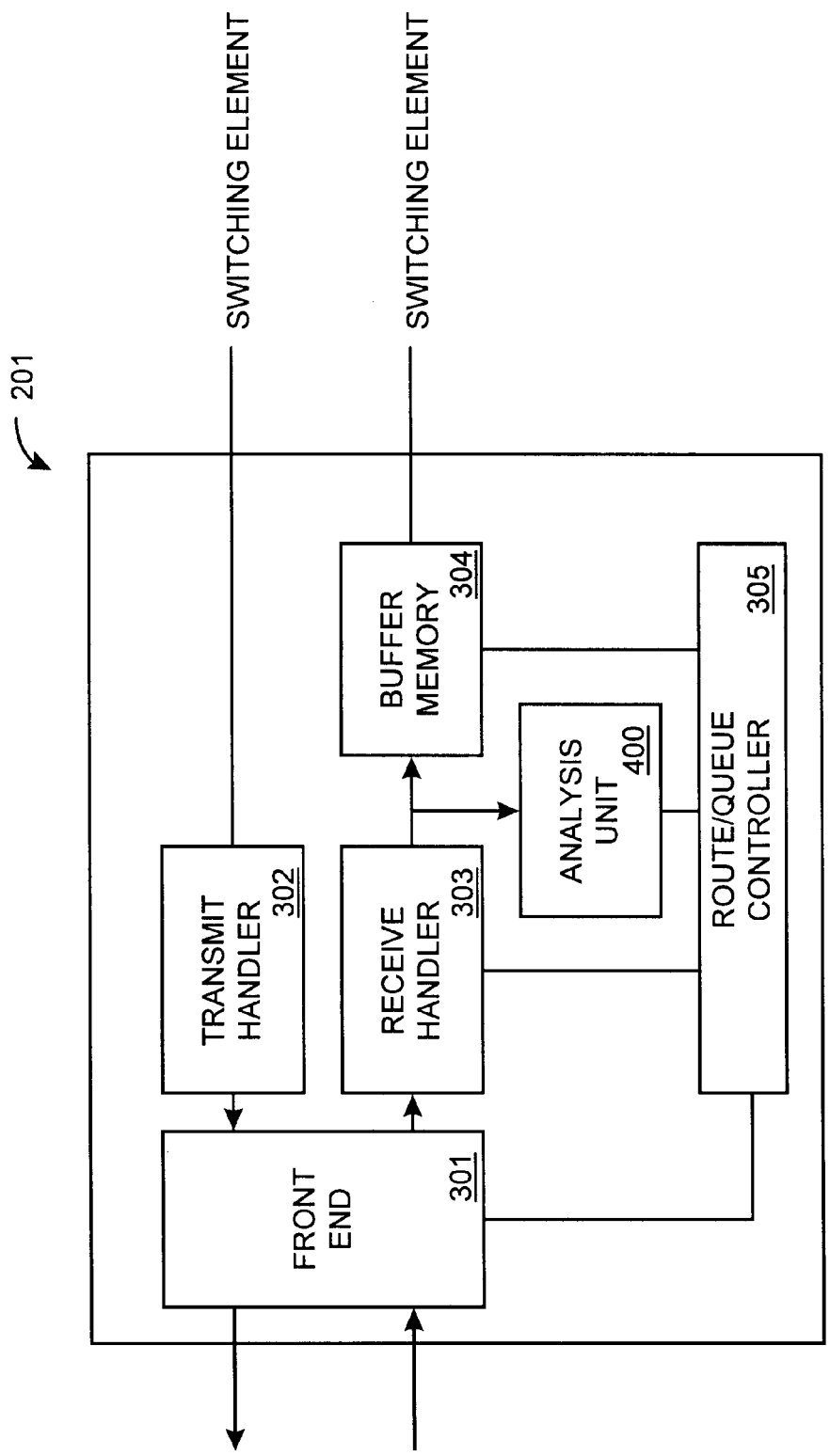
FIG. 3 illustrates a block diagram of port components in accordance with the present invention.
Figure 4:
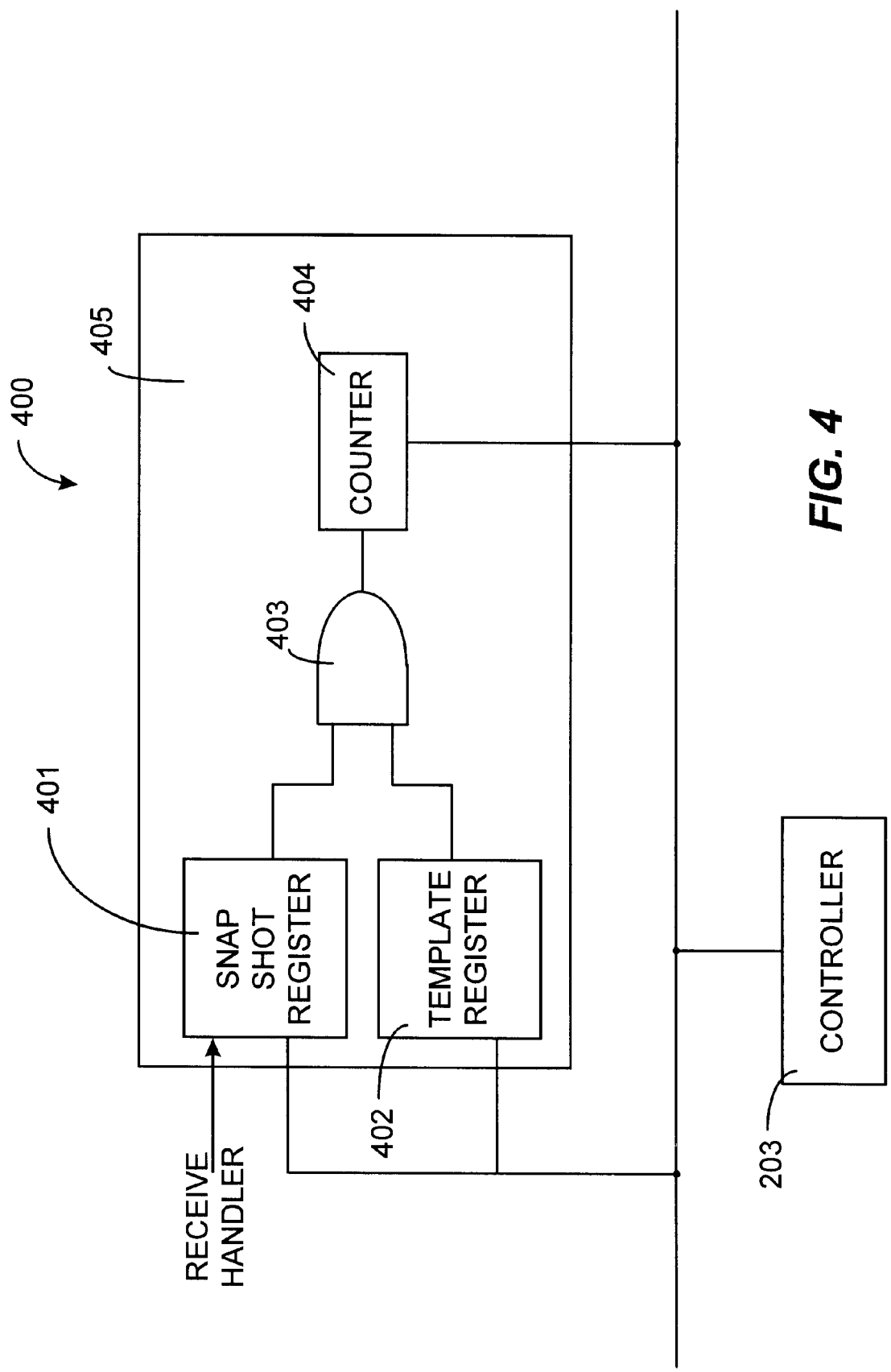
FIG. 4 shows a block diagram of an analysis unit in accordance with the present invention.

In accordance with the present invention, each port 201 includes a traffic analysis unit 400, shown in FIG. 3 and FIG. 4, that monitors connection-specific information pertaining to a particular port-to-port connection. As shown in FIG. 3, each port 201 includes a front end unit 301 that is coupled to send and receive data packets from the external link and handle all low-level processing requirements necessary to implement a link. Transmit handler 302 interfaces with the switching element to acquire frames from the switching element and transport them to front end unit 301 for transmission on the external link.

The analysis system in accordance with the present invention is preferably implemented in the receive path of port 201. Receive handler 303 obtains data frames from front end unit 301 and is responsible for writing the frames into available locations in buffer memory 304. When a connection is established between the port 201 as a source port and a destination port 201, the appropriate frame(s) are read out from buffer memory 304 and placed on the switching element.

Route/queue controller 305 provides essential and optional control operations within port 201. Route/queue controller 305 is coupled to front end unit 301 to obtain destination information from received frames and determine which port 201 within the switch 200 should receive the frame. Any available port allocation or port assignment algorithm may be used to implement route controller functionality. Route/queue controller 305 also includes logic and program devices to implement virtual queues for managing delivery of received frames. Port 201 includes other control circuitry (not shown) for detecting and handling data packets used to pass control and signaling information. Control and signaling packets are normally prevented from passing into buffer 304.

Analysis unit 400, described in greater detail in reference to FIG. 4, is coupled to receive handler 303 so as to detect selected information from the packets sent to buffer memory 304. In a particular example, information is extracted from the header fields of each packet transmitted to buffer memory 304. For example, the header fields of each fibre channel frame include destination ID (i.e., a field identifying the port 201 that is the intended recipient of a frame), a source ID (i.e., a field identifying the port to which the receiver belongs), a frame type (i.e., a field identifying the FC-4 frame type). It should be noted that the destination and source ID information referred to herein refers to intra-switch information and is different from the S_ID and D_ID information in an FC-4 frame that refer to actual fabric device addresses. Other types of information or "metadata" (i.e., data that describes the frame) may be included in the header or other designated fields of a frame depending to the frame format requirements of a particular application.

Figure 5:
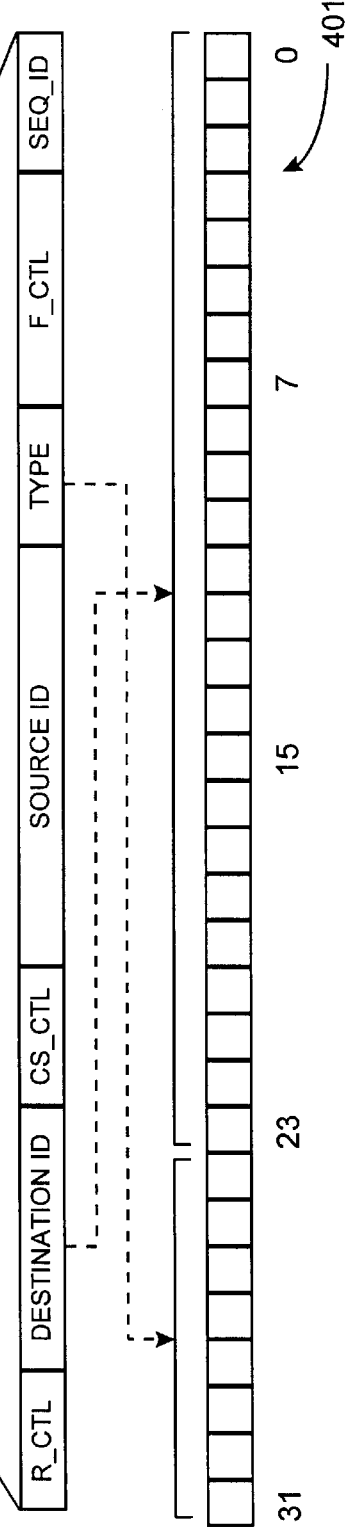
FIG. 5 illustrates a frame and snap shot register in accordance with the present invention.
Figure 6:
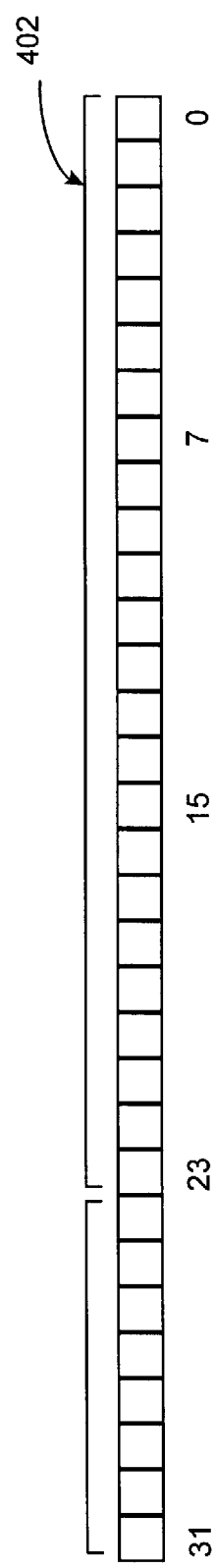
FIG. 6 shows a template register in accordance with the present invention.

As shown in FIG. 4, analysis unit 400 includes at least one snapshot register 401 coupled to receive packets, or selected packet header information, from transmit buffer 304. Snapshot register 401 comprises a plurality of memory cells such as RAM, SRAM, or the like, that hold a number of bits of information from selected fields of the transmitted data frame. In one embodiment snapshot register 401 is statically programmed to extract preselected fields from each packet header as shown in FIG. 5 and FIG. 6. Alternatively, snapshot register 401 may be coupled to controller 203 and be implemented in a dynamically programmable manner to select any portion or portions of a packet so as to use that portion for analysis. While the specific examples herein show header information analysis, it is contemplated that useful information for analysis could be included in the data portion or payload of an incoming packet. Snapshot register 401 is simply programmed to extract a specified number of bits at a specified point in the data packet. The specified point can be specified with reference to the start of frame (SOF) field, for example. In this manner, any type or quantity of information can be extracted from packets for analysis by a switch.

Template register 402 also comprises a plurality of one-bit memory cells and includes a similar number of bits of information that is supplied by controller 203 or the like. In the particular example, both snapshot register and template register are 32 bits in size, however any size and configuration register is acceptable to meet the needs of a particular application. Although only one template register is shown, multiple template registers may be used each holding a different set of information as described hereinafter.

For each frame, the contents of snapshot register 401 are logically compared with the contents of template register 402 using, for example, AND gate array 403. AND gate array 403 includes an AND gate for each bit in snap shot register 401 and template register 402 so that a logic 1 is generated to counter 404 only when a match is detected. A match is detected when the current contents of snap shot register 401 holds a destination port ID and/or frame type ID that matches the desired destination/frame type held in template register 402.

Template register 402 is coupled to controller 203 to enable template patterns to be selectively loaded into template register 402 under software/firmware control. Counter 404 is coupled to controller 203 so that it can be cleared at any time under software/firmware control. Controller 203 can read out the value stored in counter 404 at any time and use, store, archive, or forward that information on to other devices in fabric 100. In a particular example, controller 203 implements an optional application programming interface (API) that allows other devices to request the counter information from one or more ports 201 in switch 200.

In conventional fibre channel applications each switch port counts the total number of frames that are processed. When the total frame count over a period of time is compared with the destination port or frame-type specific counts held in counter 404 for that same time period, it is possible to determine a percentage of the total frames that meet the user specified criteria (e.g., go to the selected destination or are of the selected frame type).

FIG. 5 illustrates a typical frame format used in a number of frame or packet switched communication technologies. Frame 500 including a start of frame (SOF) portion, header portion, payload or data portion, and an end of frame (EOF) portion. Preferably, the present invention operates on conventional frame formats. The header field in frame 500 includes control fields (e.g., R_CTL, CS_CTL, F_CTL in FIG. 5) that communicate control and signaling information used to switch, transport, and reassemble the frames.

Suggested by dotted lines in FIG. 5, the preferred implementation extracts the Destination ID field from the header of each frame 500 and places it in a corresponding field or location (e.g., slots 0–23) of snap shot register 401. Similarly, the frame type field is extracted from the header of frame 500 and placed in a second location (e.g., slots 24–31). As discussed hereinbefore, it is contemplated that the specification of which portions of a frame 500 are extracted may be predefined in hardware or programmable such that snapshot register 401 can be configured to extract any desired portion or portions of a frame 500. FIG. 6 shows an example template register 402 having type and destination ID fields of similar size, relative position, and alignment to those described for snap shot register 401 in FIG. 5. Any available circuitry or technique can be used to logically compare snapshot register with template register 402 on a bit-by-bit basis to determine a match.

FIG. 7 illustrates a portion of queue controller 305 in greater detail that implements an optional feature in accordance with the present invention. Although undelivered frames are physically stored in buffer memory 304, route/queue controller 305 maintains a virtual queue 701 for each destination port 201 to which an undelivered frame in buffer memory 304 is addressed. Upon receipt of a packet, route/queue controller 305 creates a new queue 701 for the destination port if none exists or will add the entry to the end of an already existing destination port queue 701. Each virtual queue 701 comprises an entry for each undelivered frame that is bound for the destination port associated with that virtual queue. The entry comprises information such as a pointer to the buffer in buffer memory 304 where the frame is stored, a time stamp indicating when the frame was placed in the queue, as well as well as status/routing information that is desired in a particular application. Any available technology and algorithm for virtual queue management may be used, although an optional feature of the present invention includes queue timing.

The queue timing feature enables one or more timers such as short timer 702 and long timer 703 to measure the elapsed time that a particular frame has been in queue 701. Timers 702 and/or 703 enable timing of queues 701 for efficiency in forwarding frames. This timing information in combination with path monitoring described hereinbefore can be used to optimize switch performance and configuration. In operation, short queue timer 702 will increment its counter 704 at a first elapsed time, (e.g., 200 microseconds). Similarly, the long timer 703 will increment its counter 705 at a second elapsed time (e.g., 2 milliseconds). When a frame is forwarded before the first or second elapsed time, the associated timers 702 and 703 are reset and the corresponding counter is not incremented.

By way of example, the diagnostic information provided by the timers 702 and 703 can be used to determine the source of apparent efficiency problems. For example, if the total count of frames in a queue 701 is low, and the queue timer counts are low, the source is simply not delivering frames to the switch, but no switch deficiency is suggested. In contrast, if the count of frames in the queue 701 is low, but the timer counts in counters 704 and/or 705 are high, a congestion problem at the destination port is suggested. If both the count of frames in a queue 701 is high yet the timer counts are low, the source port may be congested.

In a particular implementation, timers 702 and 703 monitor only the first (e.g., the oldest) frame in a queue 701 and can use the timestamp information stored in the queue entry if desired. The best contemplated operation of this timer mechanism is to measure only the time that the first frame has been at the head of the queue, and to not measure the total elapsed time that the frame has been in the queue 701. Each frame will in fact incur a cumulative latency caused by the delays in delivering any frames before it in a queue 701. However, this cumulative latency is of less interest that the incremental delay incurred by each packet. Accordingly, in the preferred operation counters 704 and 705 are only incremented when a particular frame is delayed and do not account for the cumulative delay incurred by each frame in the queue.

The present invention is described in terms of a system that analyzes receive packets on the source-port side of a connection, but could readily be adapted to analyze packets received into a destination port 201. In that case, snap shot register 401 would be modified to extract the source ID information from the frame header. A substantially similar template register and counter mechanism can be used with this alternative implementation.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A switch, comprising:

a plurality of input/output (I/O) ports;

a switching element programmably coupling a first of the I/O ports with a second of the I/O ports;

a first register coupled to the first I/O port and sized to hold at least one metadata field from data in the first I/O port;

a second register configured to hold a template;

a counter generating a value indicating a number of counts received; and a comparator coupled to the first and second registers and coupled to increment the counter when the metadata held in the first register matches the template held in the second register.

2. The switch of claim 1 wherein the at least one metadata field is associated with a port ID of the second I/O port.

3. The switch of claim 1 wherein the at least one metadata field is associated with an FC-4 frame type identifier.

4. The switch of claim 1 wherein the at least one metadata field corresponds to a destination port ID.

5. The switch of claim 1 further comprising a timer coupled to time how long each data frame is held in the I/O port.

6. The switch of claim 1 further comprising an application programming interface coupled to the counter to supply the value stored in the counter to external application software.

7. A communication system, comprising:

a plurality of network devices, each device having a node for communicating with external devices;

a switch having a plurality of input/output (I/O) ports;

a communication path coupling each of the plurality of nodes to one of the I/O ports of the switch;

a switching element within the switch operable to programmably couple a selected source I/O port with a selected destination I/O port;

a first register coupled to the selected source I/O port and sized to hold at least one metadata field from data in the selected source I/O port;

a second register configured to hold a template;

a counter generating a value indicating a number of counts received; and a comparator coupled to the first and second registers and coupled to increment the counter when the metadata held in the first register matches the template held in the second register.

8. The system of claim 7 wherein the first and second registers, the counter, and the comparator are located within the selected source I/O port.

9. The system of claim 7 wherein the first and second registers, the counter, and the comparator are located within the selected destination I/O port.

10. The system of claim 9 wherein the at least one metadata field is associated with a port ID of the selected destination I/O port.

11. The system of claim 9 wherein the at least one metadata field is an FC-4 frame type identifier.

12. A method for operating a switch in a communication system, comprising:

providing a plurality of I/O ports;

generating a first connection request in a first of the plurality of I/O ports;

supplying a template to the first I/O port;

in response to a data frame in the first I/O port, determining whether selected information in the data frame matches the supplied template; and when a match is determined, incrementing a counter.

13. The method of claim 12 wherein said determining comprises determining whether metadata information in the data frame matches the supplied template.

14. The method of claim 12 wherein said determining comprises determining whether FC-4 frame type identifier information in the data frame matches the supplied template.

15. The method of claim 12 wherein said determining comprises determining whether IP frame type identifier information in the data frame matches the supplied template.

16. The method of claim 12 wherein said determining comprises determining whether SCSI frame type identifier information in the data frame matches the supplied template.

17. The method of claim 12 wherein said determining comprises determining whether FC-SW frame type identifier information in the data frame matches the supplied template.

18. The method of claim 12 wherein said determining comprises determining whether SBCCS frame type identifier information in the data frame matches the supplied template.

19. The method of claim 12 wherein said determining comprises determining whether destination identification and metadata information in the data frame matches the supplied template.

20. The method of claim 12 further comprising timing how long each data frame is held in the I/O port.

* * * * *